United States Patent
Hamakawa

(10) Patent No.: US 10,620,938 B2
(45) Date of Patent: Apr. 14, 2020

(54) SERVER APPARATUS, NON-TRANSITORY COMPUTER READABLE RECORDING MEDIUM, AND UPDATE SYSTEM FOR UPDATING FIRMWARE OF AN EXTERNAL DEVICE CONNECTED TO A CLIENT APPARATUS

(71) Applicant: KYOCERA Document Solutions Inc., Osaka-shi, Osaka (JP)

(72) Inventor: Takeshi Hamakawa, Osaka (JP)

( * ) Notice: Subject to any disclaimer, the term of this patent is extended or adjusted under 35 U.S.C. 154(b) by 0 days.

(21) Appl. No.: 16/222,576

(22) Filed: Dec. 17, 2018

(65) Prior Publication Data

US 2019/0205114 A1    Jul. 4, 2019

(30) Foreign Application Priority Data

Oct. 31, 2017    (JP) .................. 2017-210443

(51) Int. Cl.
*G06F 8/65*    (2018.01)
*H04L 29/08*    (2006.01)
*G06F 9/455*    (2018.01)
*G06F 8/654*    (2018.01)

(52) U.S. Cl.
CPC ............... *G06F 8/65* (2013.01); *G06F 8/654* (2018.02); *G06F 9/45558* (2013.01); *H04L 67/34* (2013.01); *G06F 2009/4557* (2013.01); *G06F 2009/45562* (2013.01); *G06F 2009/45595* (2013.01)

(58) Field of Classification Search
CPC ........ G06F 8/65; G06F 8/654; G06F 9/45558; G06F 2009/45562; G06F 2009/4557; G06F 2009/45595; H04L 67/34

USPC ..................................... 717/168–173; 718/1
See application file for complete search history.

(56) References Cited

U.S. PATENT DOCUMENTS

| 2004/0194081 A1* | 9/2004 | Qumei ..................... G06F 8/65 717/173 |
| 2005/0071385 A1* | 3/2005 | Rao ........................ G06F 8/65 |
| 2006/0036832 A1* | 2/2006 | Makiyama ........... G06F 9/4401 712/1 |

(Continued)

FOREIGN PATENT DOCUMENTS

| JP | 2015-225525 | 6/2017 | |
| WO | WO-2008123730 A1 * | 10/2008 | ............... G06F 8/65 |

*Primary Examiner* — Qing Chen
(74) *Attorney, Agent, or Firm* — Calfee, Halter & Griswold LLP

(57) ABSTRACT

A server apparatus determines a configuration of a second processor via the network interface, the second processor being a processor of the client apparatus, determines an environment capable of executing the update program, selects a virtual machine source for generating a virtual machine that virtually realizes the determined environment out of the plurality of different virtual machine sources that the memory stores, generates a virtual machine that virtually realizes the environment by the second processor, by using the selected virtual machine source, generates a package including the generated virtual machine, the firmware, and the update program, and sends the package and a control command for installing the package in the client apparatus to the client apparatus via the network interface to cause the client apparatus to execute the update program by the virtual machine to update the firmware in the external device.

6 Claims, 15 Drawing Sheets

(56) References Cited

U.S. PATENT DOCUMENTS

| | | | |
|---|---|---|---|
| 2008/0244553 A1* | 10/2008 | Cromer | G06F 21/572 717/168 |
| 2012/0174095 A1* | 7/2012 | Natchadalingam | G06F 8/65 718/1 |
| 2017/0192770 A1* | 7/2017 | Ujiie | G06F 8/654 |

* cited by examiner

SERVER APPARATUS, NON-TRANSITORY COMPUTER READABLE RECORDING MEDIUM, AND UPDATE SYSTEM FOR UPDATING FIRMWARE OF AN EXTERNAL DEVICE CONNECTED TO A CLIENT APPARATUS

INCORPORATION BY REFERENCE

This application claims the benefit of Japanese Priority Patent Application JP 2017-210443 filed Oct. 31, 2017, the entire contents of which are incorporated herein by reference.

FIELD

The present disclosure relates to a server apparatus capable of updating firmware of an external device connected to a client apparatus, which is an embedded device, a non-transitory computer readable recording medium that records an update program, and an update system.

BACKGROUND

There is known a program of updating firmware.

In some cases, an external device (card reader, etc.) such as a USB (Universal Serial Bus) device is connected to an embedded device such as an image forming apparatus (Multifunction Peripheral, hereinafter referred to as MFP) and used. Such an external device may be used very frequently every day. In view of the aforementioned circumstances, it is desirable to provide a user-friendly technology of updating firmware of an external device.

SUMMARY

According to an embodiment of the present disclosure, there is provided a server apparatus, including:
  a network interface adapted to communicate with a client apparatus, the client apparatus being an embedded device connected to a network;
  a memory that stores
    firmware of an external device connected to the client apparatus,
    an update program of the firmware,
    a plurality of different virtual machine sources for generating virtual machines that virtually realize a plurality of different environments, respectively, and
    a remote update program; and
  a first processor that executes the remote update program,
  in which
  when the first processor executes the remote update program, the first processor
    determines a configuration of a second processor via the network interface, the second processor being a processor of the client apparatus,
    determines an environment capable of executing the update program,
    selects a virtual machine source for generating a virtual machine that virtually realizes the determined environment out of the plurality of different virtual machine sources that the memory stores,
    generates a virtual machine that virtually realizes the environment by the second processor, by using the selected virtual machine source,
    generates a package including the generated virtual machine, the firmware, and the update program, and
    sends the package and a control command for installing the package in the client apparatus to the client apparatus via the network interface to cause the client apparatus to execute the update program by the virtual machine to update the firmware in the external device.

According to an embodiment of the present disclosure, there is provided a non-transitory computer readable recording medium that records a remote update program executable by a server apparatus,
  the server apparatus including
  a network interface adapted to communicate with a client apparatus, the client apparatus being an embedded device connected to a network,
  a memory that stores
    firmware of an external device connected to the client apparatus,
    an update program of the firmware, and
    a plurality of different virtual machine sources for generating virtual machines that virtually realize a plurality of different environments, respectively, and
  a first processor,
  the remote update program causing the first processor of the server apparatus to:
    determine a configuration of a second processor via the network interface, the second processor being a processor of the client apparatus;
    determine an environment capable of executing the update program;
    select a virtual machine source for generating a virtual machine that virtually realizes the determined environment out of the plurality of different virtual machine sources that the memory stores;
    generate a virtual machine that virtually realizes the environment by the second processor, by using the selected virtual machine source;
    generate a package including the generated virtual machine, the firmware, and the update program; and
    send the package and a control command for installing the package in the client apparatus to the client apparatus via the network interface to cause the client apparatus to execute the update program by the virtual machine to update the firmware in the external device.

According to an embodiment of the present disclosure, there is provided an update system, including:
  a client apparatus being an embedded device connected to a network;
  an external device connected to the client apparatus; and
  a server apparatus connected to the network,
  the server apparatus including
  a network interface adapted to communicate with the client apparatus,
  a memory that stores
    firmware of an external device connected to the client apparatus,
    an update program of the firmware,
    a plurality of different virtual machine sources for generating virtual machines that virtually realize a plurality of different environments, respectively, and
    a remote update program, and
  a first processor that executes the remote update program,
  in which
  when the first processor executes the remote update program, the first processor determines a configuration of a second processor via the network interface, the second processor being a processor of the client apparatus, determines an environment capable of executing the update program, selects a virtual machine source for generating a virtual machine that virtually realizes the determined environment out of the plurality of different virtual machine sources that the memory stores, generates a virtual machine that virtually realizes the environment by the second processor, by using the selected virtual machine source, generates a package including the generated virtual machine, the firmware, and the update program, and sends the package and a control command for installing the package in the client apparatus to the client apparatus via the network interface to cause the client apparatus to execute the update program by the virtual machine to update the firmware in the external device.

These and other objects, features and advantages of the present disclosure will become more apparent in light of the following detailed description of best mode embodiments thereof, as illustrated in the accompanying drawings.

DETAILED DESCRIPTION

Hereinafter, an embodiment of the present disclosure will be described with reference to the drawings.

1. OUTLINE OF UPDATE SYSTEM

Figure 1:
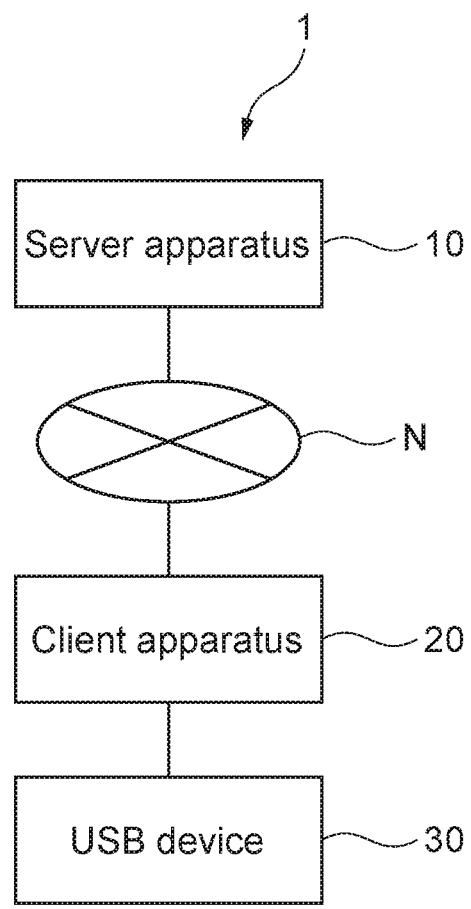
FIG. 1 schematically shows an update system according to an embodiment of the present disclosure.

FIG. 1 schematically shows an update system according to an embodiment of the present disclosure.

The update system 1 includes the server apparatus 10, the client apparatus 20, and the external device 30. The server apparatus 10 and the client apparatus 20 are connected to the network N such as the Internet and a LAN (Local Area Network), and are communicable with each other.

The server apparatus 10 is capable of remotely operating the client apparatus 20 via the network N. The server apparatus 10 is, typically, a personal computer. The server apparatus 10 is used by a user in charge of managing the client apparatus 20 (an engineer hired by a vendor of the client apparatus 20, a worker at an office in charge of maintaining the client apparatus 20, or the like).

The client apparatus 20 is an electronic apparatus other than a typical personal computer. In other words, the client apparatus 20 is an electronic apparatus (so-called embedded device) including an embedded system. In the present embodiment, the client apparatus 20 is an image forming apparatus (MFP, etc.).

In the present embodiment, the external device 30 is a non-dedicated USB (Universal Serial Bus) device (hereinafter, referred to as the USB device 30). More specifically, the USB device 30 is a card reader. the USB device 30 is connected to the client apparatus 20 via USB.

The USB device 30 such as a card reader may be used very frequently every day. For example, if the client apparatus 20 (MFP) is at an office, a user (worker) may log in to the client apparatus 20 (MFP) via the USB device 30 (card reader) with his/her ID card and then use the client apparatus 20 (MFP).

By the way, in order to update the firmware installed in the USB device 30 connected to the client apparatus 20, typically, the following procedure is executed in the following order. The USB device 30 (non-dedicated USB device) is removed from the client apparatus 20 (MFP), and is connected to a personal computer (not shown). The personal computer executes an update program, and updates the firmware in the USB device 30. Next, the USB device 30, in which the firmware is updated, is removed from the personal computer, and is connected to the client apparatus 20, which is an embedded device. However, according to this method, the USB device 30 is removed and connected again and again, which is burdensome for a user. In addition, when the USB device 30 is removed from the client apparatus 20, it is impossible to use the USB device 30 connected to the client apparatus 20.

In view of the aforementioned circumstances, it is desirable to update the firmware installed in the USB device 30 connected to the client apparatus 20 without removing the USB device 30 from the client apparatus 20. In view of the aforementioned circumstances, according to the present embodiment, the server apparatus 10 remotely updates the firmware installed in the USB device 30 connected to the client apparatus 20 via the network N.

2. HARDWARE CONFIGURATION OF SERVER APPARATUS

Figure 2:
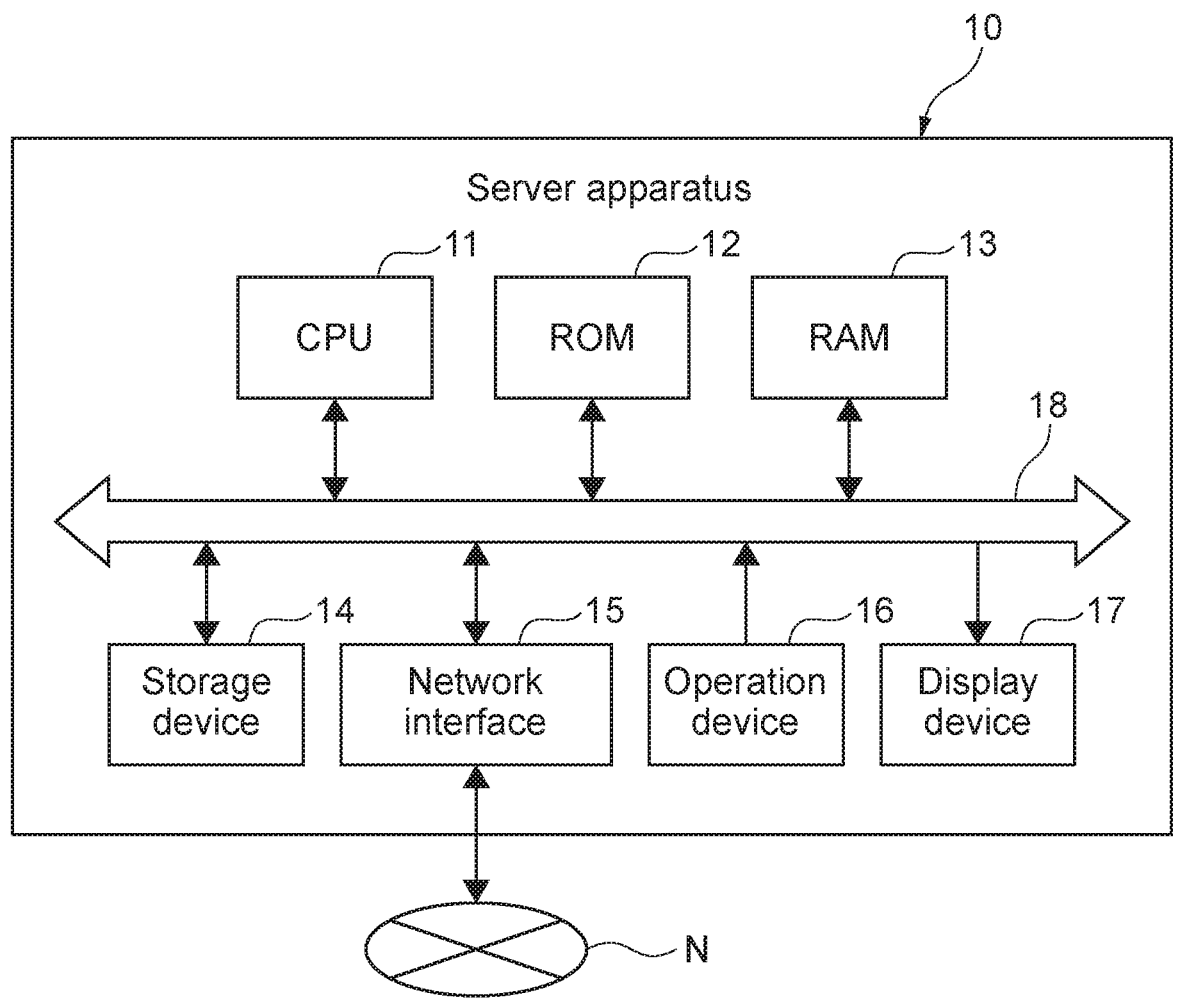
FIG. 2 shows hardware configuration of the server apparatus.

FIG. 2 shows hardware configuration of the server apparatus.

The server apparatus 10 includes the CPU (Central Processing Unit) 11 (first processor), the ROM (Read Only Memory) 12 (memory), the RAM (Random Access Memory) 13, the storage device 14 (memory), the network interface 15, the operation device 16, the display device 17, and the bus 18 connecting them each other.

The CPU 11 (processor) loads information processing programs (including remote update program) stored in the ROM 12 in the RAM 13 and executes the information processing programs. The ROM 12 fixedly stores the programs executed by the CPU 11, data, and the like.

The storage device 14 is a large-volume recording medium such as an HDD (Hard Disk Drive) and an SSD (Solid State Drive).

The network interface 15 is an interface for connecting to the network N.

The operation device 16 includes a touch panel, a keyboard, a mouse, various switches, and the like. The operation device 16 detects operations input by a user, and outputs signals to the CPU 11.

The display device 17 includes an LCD, an organic EL display, or the like. The display device 17 receives information from the CPU 11, executes computing process on the basis of the received information, and displays generated image signals on a screen. The display device 17 may be an external display device.

3. HARDWARE CONFIGURATION OF CLIENT APPARATUS

Figure 3:
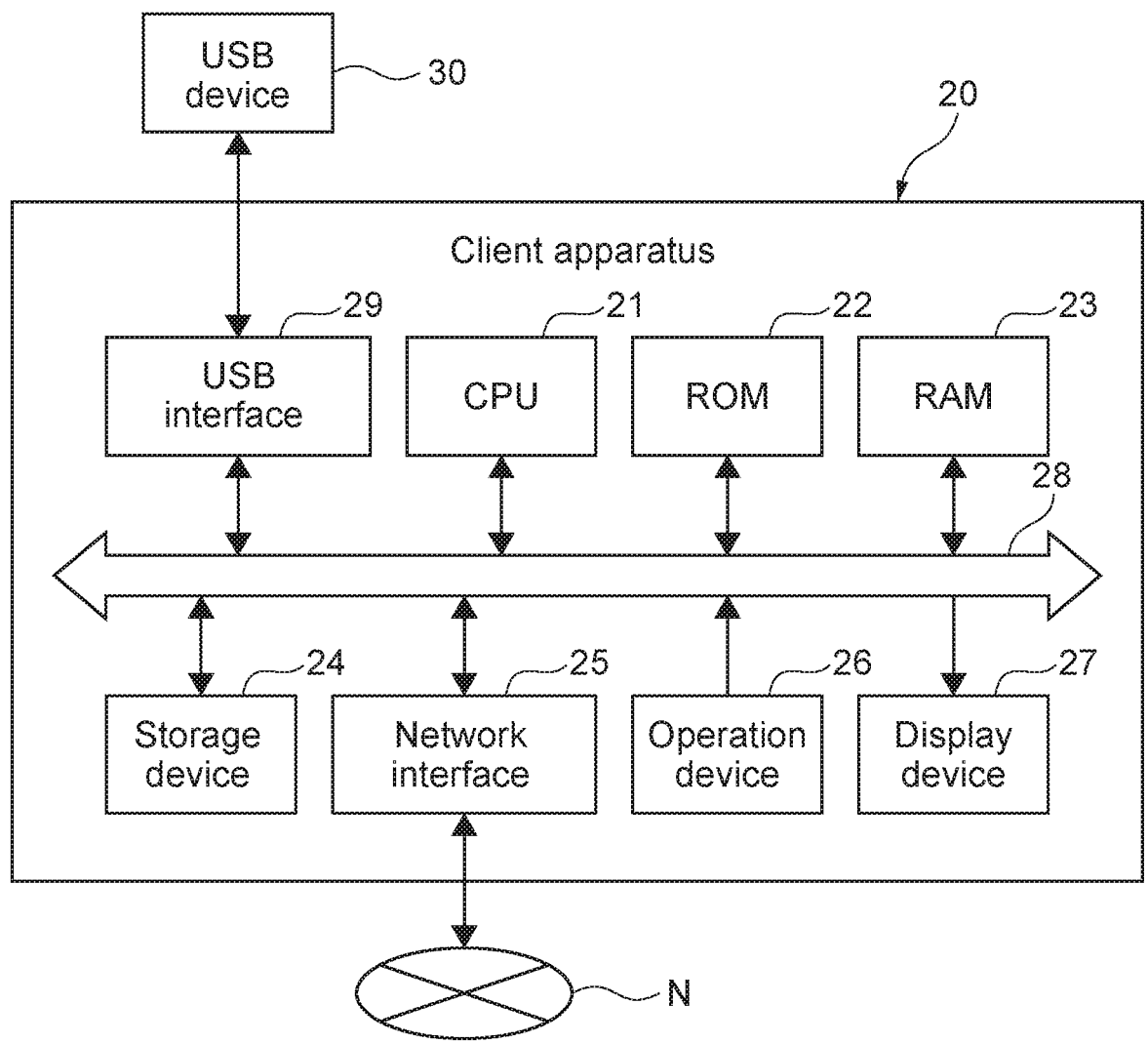
FIG. 3 shows hardware configuration of the client apparatus.

FIG. 3 shows hardware configuration of the client apparatus.

The client apparatus 20 includes the CPU 21 (second processor), the ROM 22 (memory), the RAM 23, the storage device 24, the network interface 25, the operation device 26, the display device 27, the USB interface 29, and the bus 28 connecting them each other.

The CPU 21 (processor) loads information processing programs stored in the ROM 22 in the RAM 23 and executes the information processing programs. The ROM 22 fixedly stores the programs executed by the CPU 21, data, and the like.

The storage device 24 is a large-volume recording medium such as an HDD and an SSD.

The network interface 25 is an interface for connecting to the network N.

The operation device 26 includes a touch panel, various switches, and the like. The operation device 26 detects operations input by a user, and outputs signals to the CPU 21.

The display device 27 includes an LCD, an organic EL display, or the like. The display device 27 receives information from the CPU 21, executes computing process on the basis of the received information, and displays generated image signals on a screen.

The USB interface 29 is an interface for connecting a peripheral device such as the USB device 30 to the client apparatus 20 being a host apparatus via USB.

If the client apparatus 20 is an MFP, the client apparatus 20 includes an image scanner, a printer, and the like. They are not shown since they have less relation with the present technology.

4. HARDWARE CONFIGURATION OF EXTERNAL DEVICE

Figure 4:
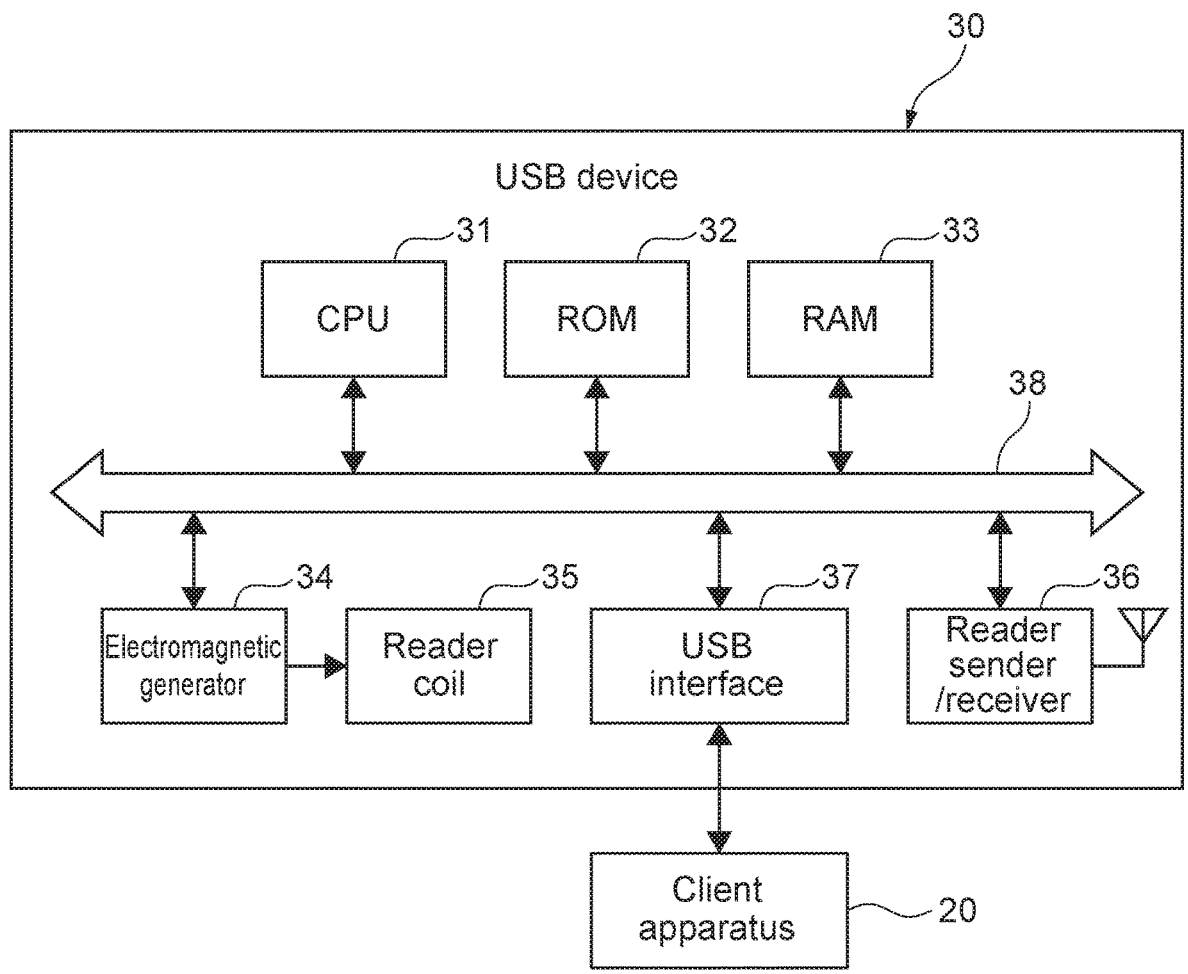
FIG. 4 shows hardware configuration of the external device.

FIG. 4 shows hardware configuration of the external device.

The USB device 30 (card reader) includes the CPU 31 (processor), the ROM 32 (memory), the RAM 33, the electromagnetic generator 34, the reader coil 35, the reader sender/receiver 36, the USB interface 37, and the bus 38 connecting them each other.

The CPU 31 (processor) loads information processing programs stored in the ROM 32 in the RAM 33 and executes the information processing programs. The ROM 32 fixedly stores the programs executed by the CPU 31, data, and the like.

The electromagnetic generator 34 controls AC current applied to the reader coil 35.

the reader coil 35 is a loop antenna that generates electromagnetic waves. The electromagnetic waves are received by an IC card (not shown).

The reader sender/receiver 36 communicates with the IC card via near field communication by using an antenna different from the reader coil 35, and thereby receives data signals from the IC card.

The USB interface 37 is an interface for connecting to the client apparatus 20 being a host apparatus via USB.

5. DATA THAT SERVER APPARATUS STORES

Figure 5:
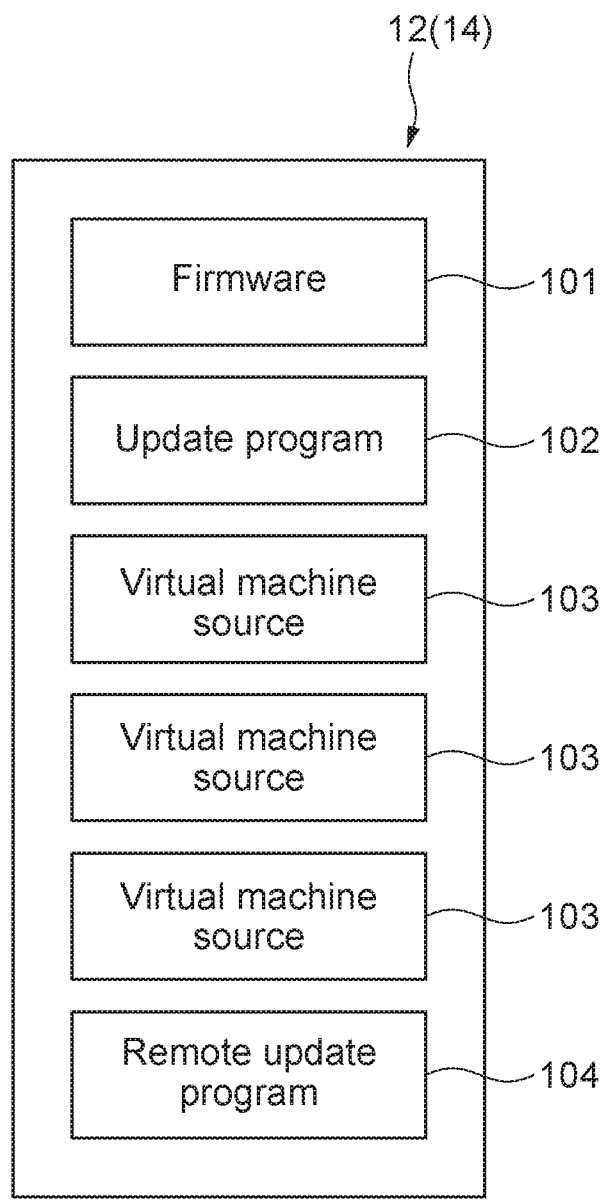
FIG. 5 schematically shows data that the server apparatus stores.

FIG. 5 schematically shows data that the server apparatus stores.

The server apparatus 10 stores the firmware 101, the update program 102, the plurality of different virtual machine sources 103, and the remote update program 104 in the ROM 12 and/or the storage device 14.

The firmware 101 is firmware of the newest version of the USB device 30.

The update program 102 is a program for updating the firmware 101 in the USB device 30. The update program 102 supports only a certain environment (operating system (OS)). In other words, the update program 102 is configured to be executable only by a personal computer (not shown) capable of executing a certain environment (OS). For a specific example, the update program 102 is configured to be executable only by a personal computer (not shown) capable of executing Windows (registered trademark) OS of a certain version and/or mac OS (registered trademark) of a certain version. In detail, the update program 102 is configured such that a personal computer executes the update program 102 to be capable of updating the firmware 101 in the USB device 30 connected to the personal computer.

The update program 102 and the firmware 101 of the USB device 30 are supplied by a vendor of the USB device 30. The CPU 11 of the server apparatus 10 downloads the firmware 101 and the update program 102 via the network N, and records the firmware 101 and the update program 102 in the ROM 12 and/or the storage device 14. Alternatively, the CPU 11 of the server apparatus 10 reads the firmware 101 and the update program 102 recorded in a non-transitory computer readable recording medium (or non-transitory computer readable recording media) such as a CD-ROM (or CD-ROMs), and records the firmware 101 and the update program 102 in the ROM 12 and/or the storage device 14.

The plurality of different virtual machine sources 103 are used for generating a plurality of different virtual machines that virtually realize a plurality of different environments (OSs), respectively. For a specific example, a certain virtual machine source 103 is used for generating a virtual machine that virtually realizes Windows (registered trademark) OS of a certain version. Another virtual machine source 103 is used for generating a virtual machine that virtually realizes mac OS (registered trademark) of a certain version.

The remote update program 104 is a program executable by the server apparatus 10 for remotely updating the firmware 101 in the USB device 30 connected to the client apparatus 20.

6. OPERATION OF UPDATE SYSTEM

Figure 6:
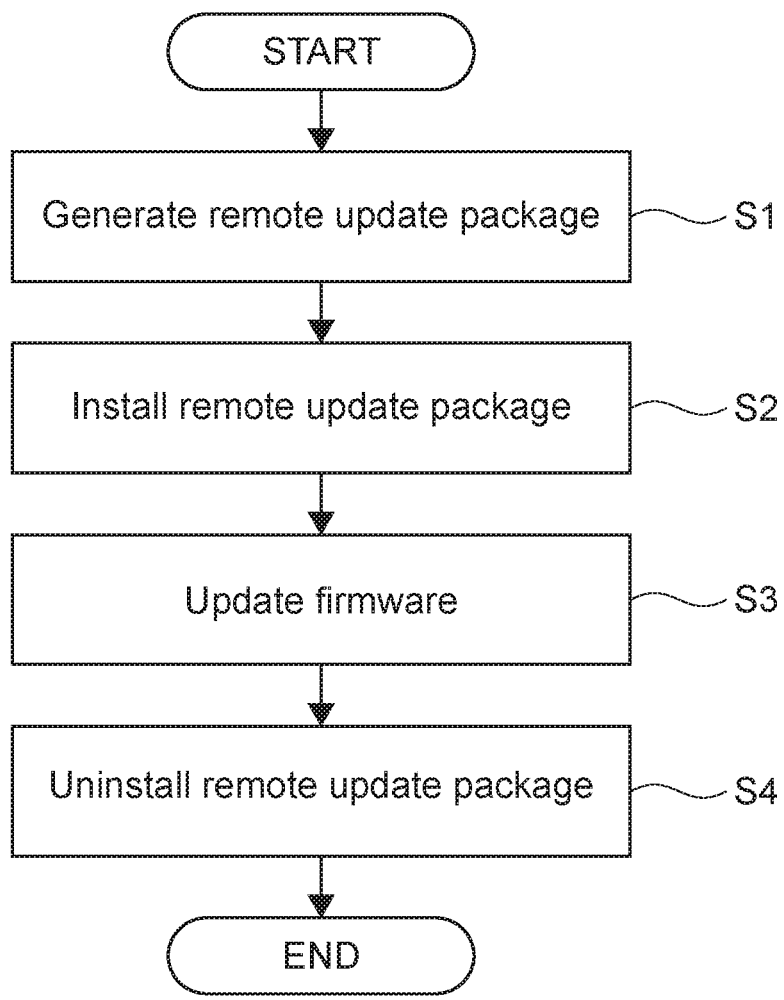
FIG. 6 is a flowchart showing an outline of an operation of the update system.
Figure 7:
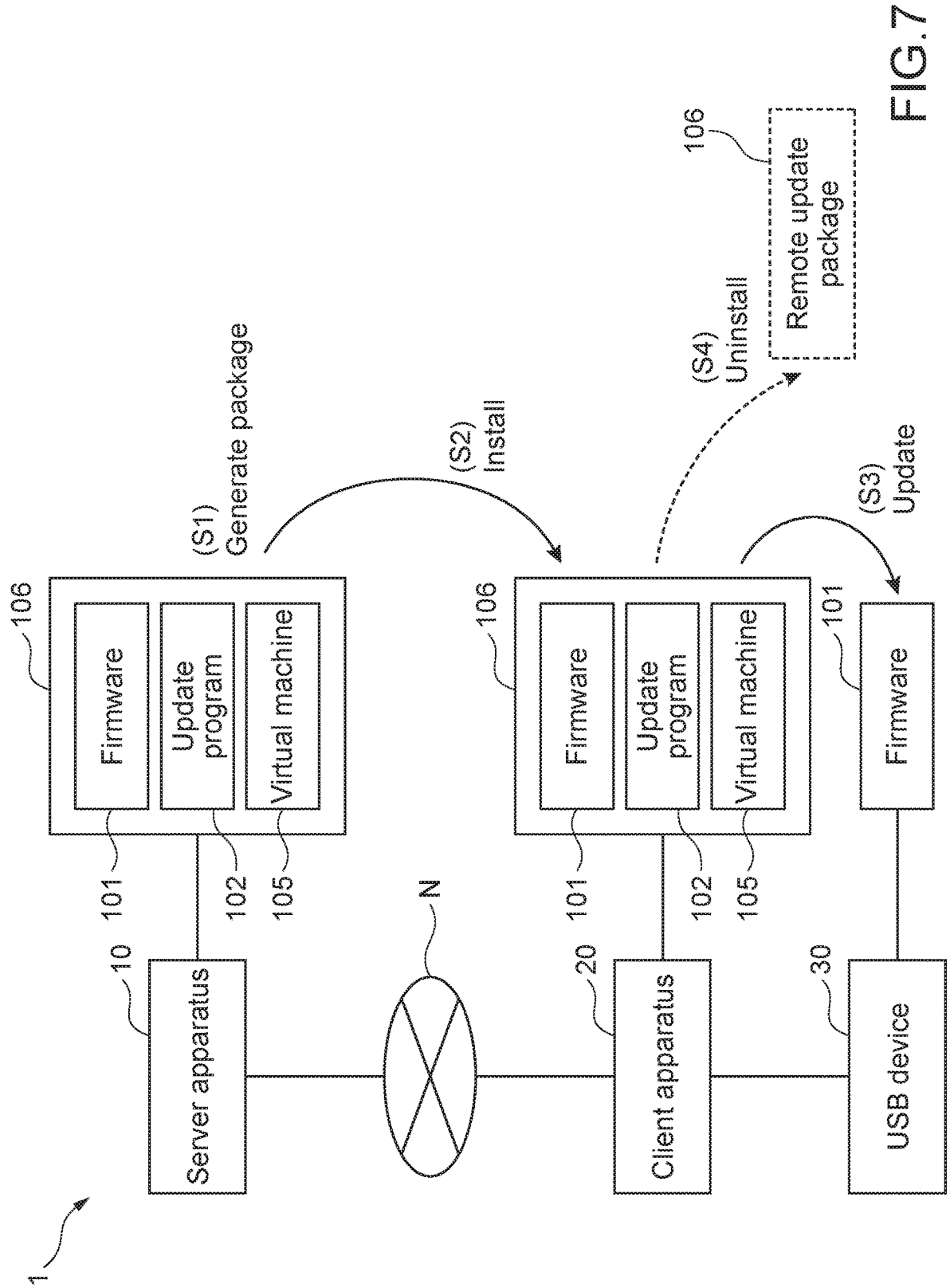
FIG. 7 schematically shows flow of data.

FIG. 6 is a flowchart showing an outline of an operation of the update system. FIG. 7 schematically shows flow of data.

The CPU 11 of the server apparatus 10 executes the remote update program 104 to thereby generate the remote update package 106 (Step S1), and thereby remotely installs the remote update package 106 in the client apparatus 20 (Step S2). The CPU 21 of the client apparatus 20 executes the remote update package 106, and thereby updates the firmware 101 in the USB device 30 (Step S3). The CPU 11 of the server apparatus 10 executes the remote update program 104, and thereby further remotely uninstall the remote update package 106 from the client apparatus 20 (Step S4). Hereinafter, the respective Steps S1 to S4 will be described in more detail.

(1) Generate Remote Update Package (Step S1)

Figure 8:
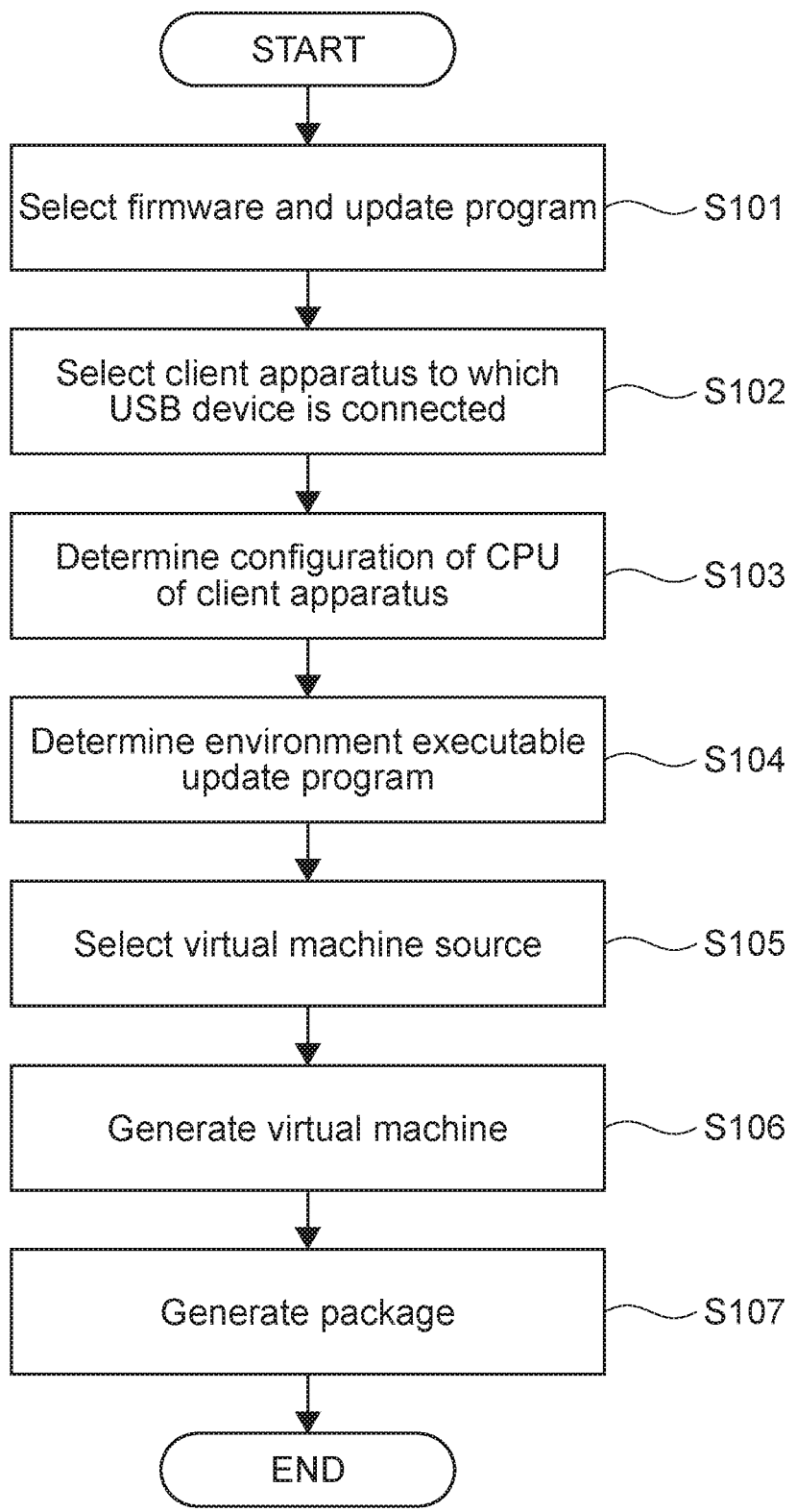
FIG. 8 shows an operational flow of generating a remote update package by the server apparatus.

FIG. 8 shows an operational flow of generating a remote update package by the server apparatus.

The CPU 11 of the server apparatus 10 selects the firmware 101 and the update program 102 to be updated, which are stored in the ROM 12 and/or the storage device 14 (Step S101).

The CPU 11 of the server apparatus 10 selects the client apparatus 20 to which the USB device 30 is connected, in which the firmware 101 is to be updated, via the network interface 15 (Step S102).

The CPU 11 of the server apparatus 10 determines the configuration of the CPU 21 of the client apparatus 20 to which the USB device 30 is connected, in which the firmware 101 is to be updated, via the network interface 15 (Step S103). The configuration of the CPU 21 of the client apparatus 20 depends on the model type of the client apparatus 20. Therefore, for example, the CPU 11 of the server apparatus 10 obtains information of the model type of the client apparatus 20, and determines the configuration of the CPU 21 depending on the model type.

The CPU 11 of the server apparatus 10 determines the environment (OS supported by the update program 102) capable of executing the selected (Step S101) update program 102 (Step S104).

The CPU 11 of the server apparatus 10 selects the virtual machine source 103 for generating a virtual machine that virtually realizes the determined (Step S104) environment (OS supported by the update program 102) out of the plurality of different virtual machine sources 103 stored in the ROM 12 and/or the storage device 14 (Step S105).

The CPU 11 of the server apparatus 10 generates the virtual machine 105 that virtually realizes the aforementioned environment (OS supported by the update program 102) by the CPU 21 of the client apparatus 20, by using the selected (Step S105) virtual machine source 103 (Step S106).

The CPU 11 of the server apparatus 10 generates the remote update package 106 including the generated virtual machine 105, and the firmware 101 and the update program 102 stored in the ROM 12 and/or the storage device 14 (Step S107).

(2) Install Remote Update Package (Step S2)

Figure 9:
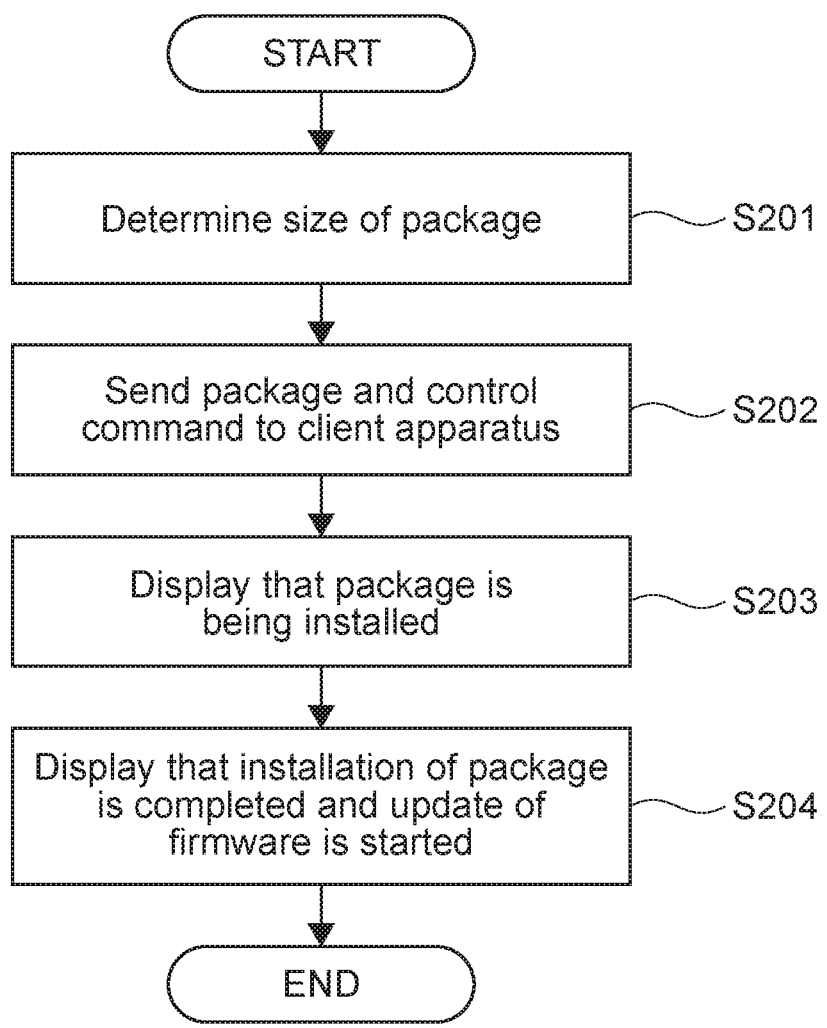
FIG. 9 shows an operational flow of installing a remote update package by the server apparatus.
Figure 10:
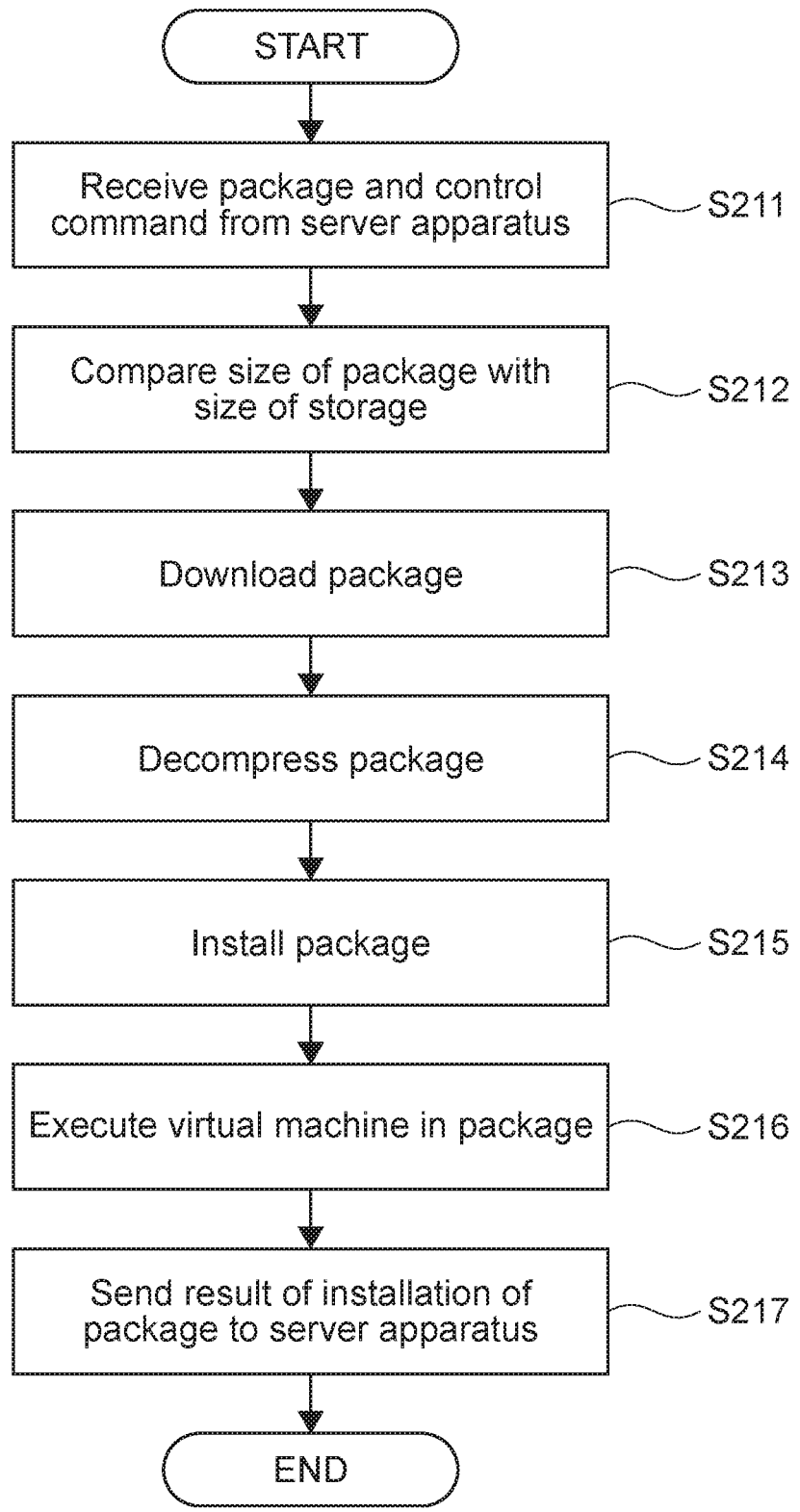
FIG. 10 shows an operational flow of installing a remote update package by the client apparatus.

FIG. 9 shows an operational flow of installing a remote update package by the server apparatus. FIG. 10 shows an operational flow of installing a remote update package by the client apparatus.

The CPU 11 of the server apparatus 10 determines the size of the generated (Step S107) remote update package 106 (Step S201). The CPU 11 of the server apparatus 10 sends the remote update package 106 and a control command for installing the remote update package 106 having the determined (Step S201) size in the client apparatus 20 to the client apparatus 20 via the network interface 15 (Step S202). The CPU 11 of the server apparatus 10 displays that the client apparatus 20 is installing the remote update package 106 on the display device 17 (Step S203).

The CPU 21 of the client apparatus 20 receives the remote update package 106 and the control command from the server apparatus 10 via the network interface 25 (Step S211). The CPU 21 of the client apparatus 20 compares the received size of the remote update package 106 with the available size of a storage (the ROM 22 or the storage device 24) of the client apparatus 20 (Step S212). If the available size of the storage is equal to or larger than the size of the remote update package 106, the CPU 21 of the client apparatus 20 starts downloading the remote update package 106 (Step S213).

The CPU 21 of the client apparatus 20 decompresses the remote update package 106 (Step S214), and installs the remote update package 106 in the storage (Step S215). The CPU 21 of the client apparatus 20 loads the virtual machine 105 in the remote update package 106 in the RAM 23, and executes the virtual machine 105 (Step S216). The CPU 21 of the client apparatus 20 sends the result of installation of the remote update package 106 to the server apparatus 10 via the network interface 25 (Step S217).

The CPU 11 of the server apparatus 10 receives the result of installation, and then displays that installation of the remote update package 106 in the client apparatus 20 is completed and the client apparatus 20 starts updating the firmware 101, on the display device 17 (Step S204).

(3) Update Firmware in External Device (Step S3)

Figure 11:
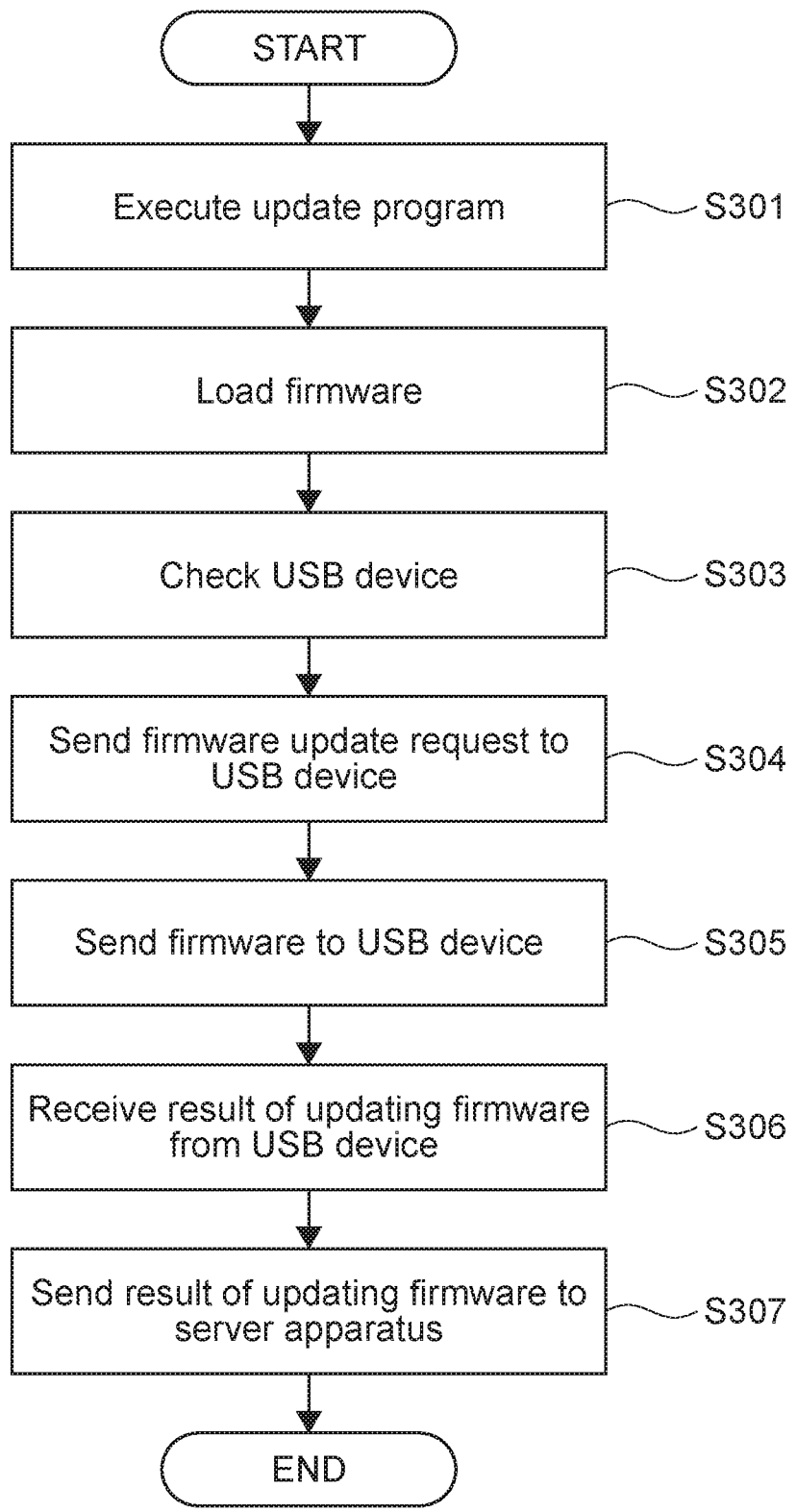
FIG. 11 shows an operational flow of updating firmware by the client apparatus.

FIG. 11 shows an operational flow of updating firmware by the client apparatus.

The CPU 21 of the client apparatus 20 loads the update program 102 in the remote update package 106 in the RAM 23. The CPU 21 of the client apparatus 20 executes the update program 102 by the virtual machine 105 (see FIG. 12 and FIG. 13) being executed (Step S216) (Step S301).

Figure 12:
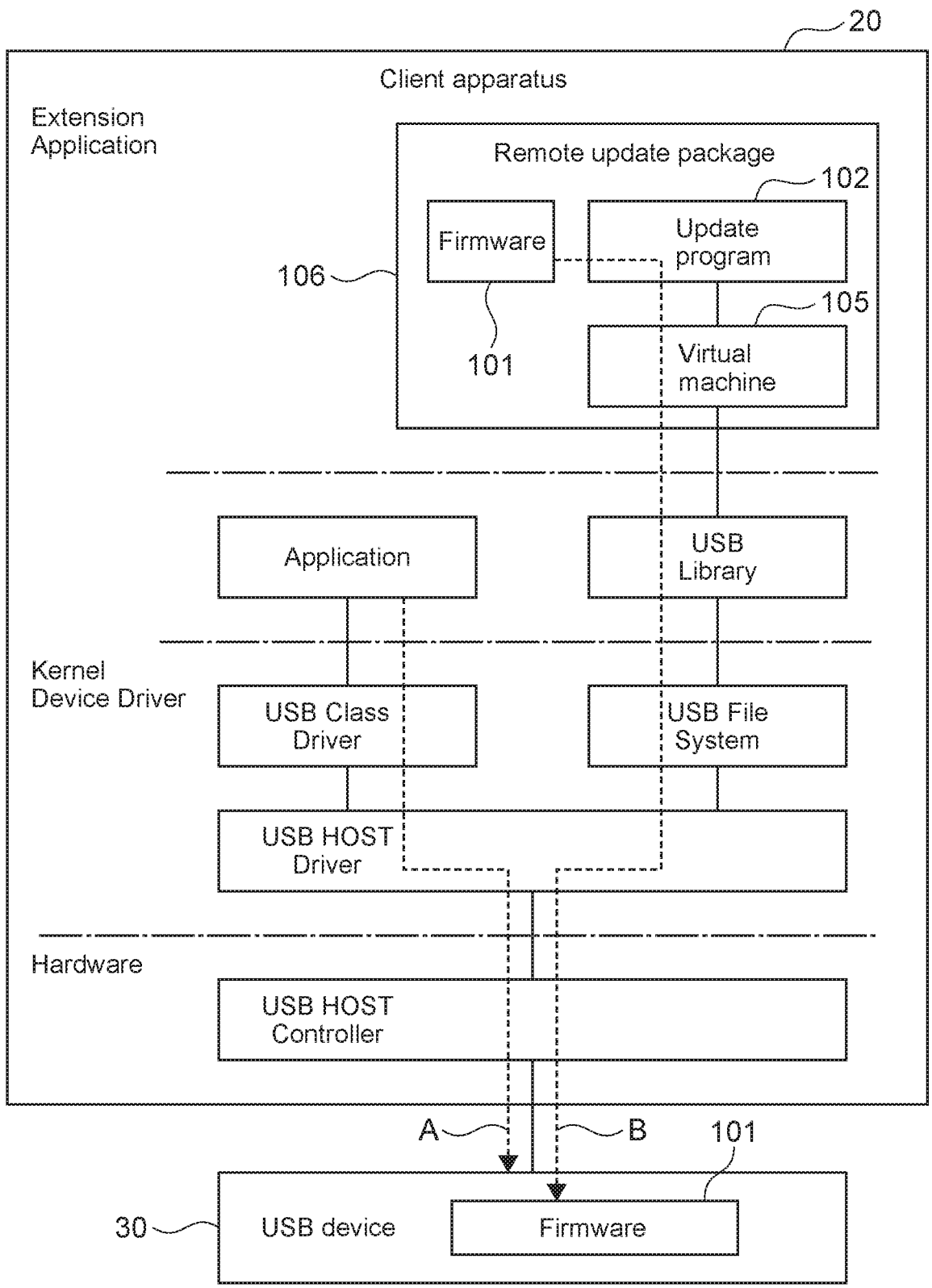
FIG. 12 shows software configuration of the client apparatus as a whole when updating the firmware.

FIG. 12 shows software configuration of the client apparatus as a whole when updating the firmware.

As shown in FIG. 12, the installed remote update package 106 is developed as an extension application, and is executed in dedicated configuration (in FIG. 12, dotted arrow B) for executing the update program 102. The dedicated configuration is different from the configuration for normal operation of the USB device 30 (in FIG. 12, dotted arrow A).

Figure 13:
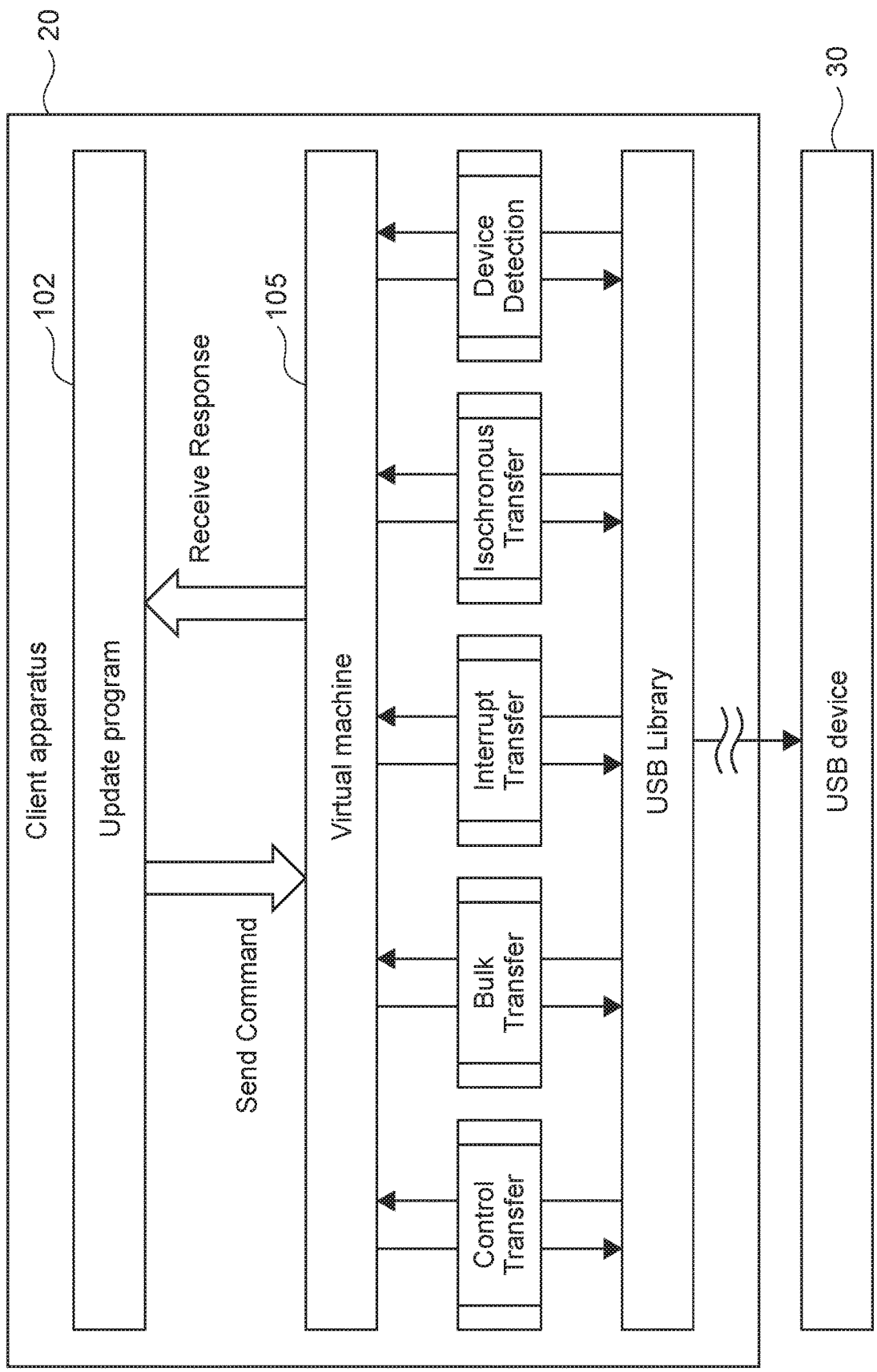
FIG. 13 shows partial software configuration of the client apparatus when updating the firmware.

FIG. 13 shows partial software configuration of the client apparatus when updating the firmware.

As shown in FIG. 13, the virtual machine 105 includes the four communication systems (control transfer, interrupt transfer, bulk transfer, and isochronous transfer) and the device detection function necessary to control the USB device 30. The virtual machine 105 plays a role of a medium for control of the USB device 30 executed by the update program 102.

The CPU 21 of the client apparatus 20 loads the firmware 101 in the RAM 23 (Step S302). The CPU 21 of the client apparatus 20 checks the USB device 30 via the USB interface 29 (Step S303). The CPU 21 of the client apparatus 20 sends a firmware update request to the USB device 30 via the USB interface 29 (Step S304), and sends the firmware 101 to the USB device 30 (Step S305).

Figure 14:
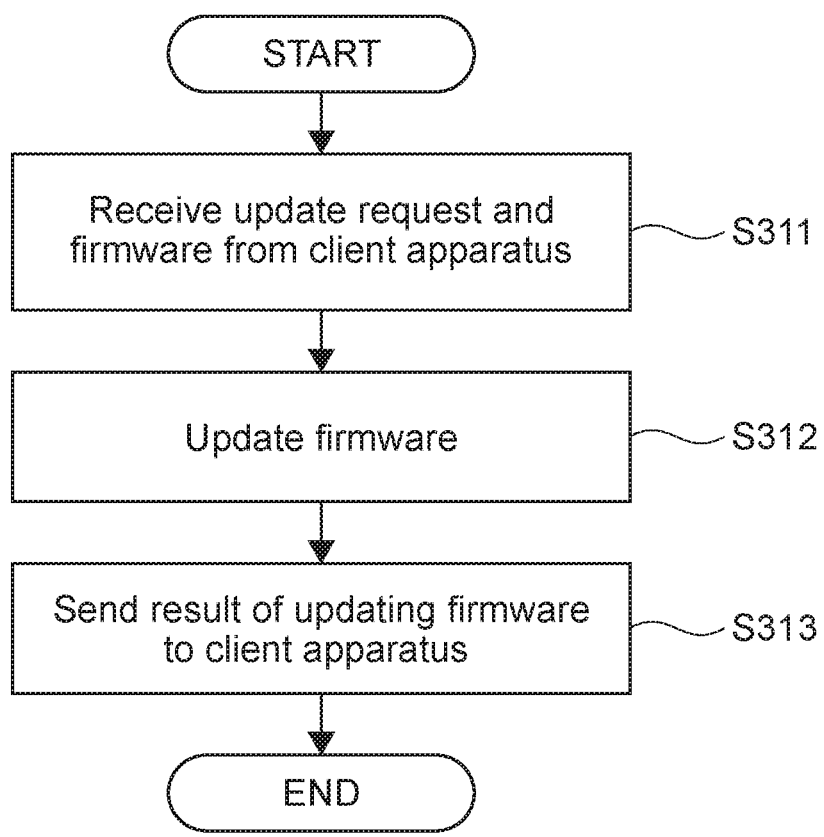
FIG. 14 shows an operational flow of updating the firmware by the external device.

FIG. 14 shows an operational flow of updating the firmware by the external device.

The CPU 301 of the USB device 30 receives the update request and the firmware 101 from the client apparatus 20 via the USB interface 37 (Step S311). The CPU 301 of the USB device 30 updates the firmware 101 (Step S312). The CPU 301 of the USB device 30 sends the result of updating the firmware 101 to the client apparatus 20 via the USB interface 37 (Step S313).

The CPU 21 of the client apparatus 20 receives the result of updating the firmware 101 from the USB device 30 via the USB interface 29 (Step S306). The CPU 21 of the client apparatus 20 sends the result of updating the firmware 101 to the server apparatus 10 via the network interface 25 (Step S307).

The CPU 11 of the server apparatus 10 receives the update result from the client apparatus 20 via the network interface 15, and then displays that update of the firmware 101 is completed on the display device 17.

(4) Uninstall Remote Update Package (Step S4)

Figure 15:
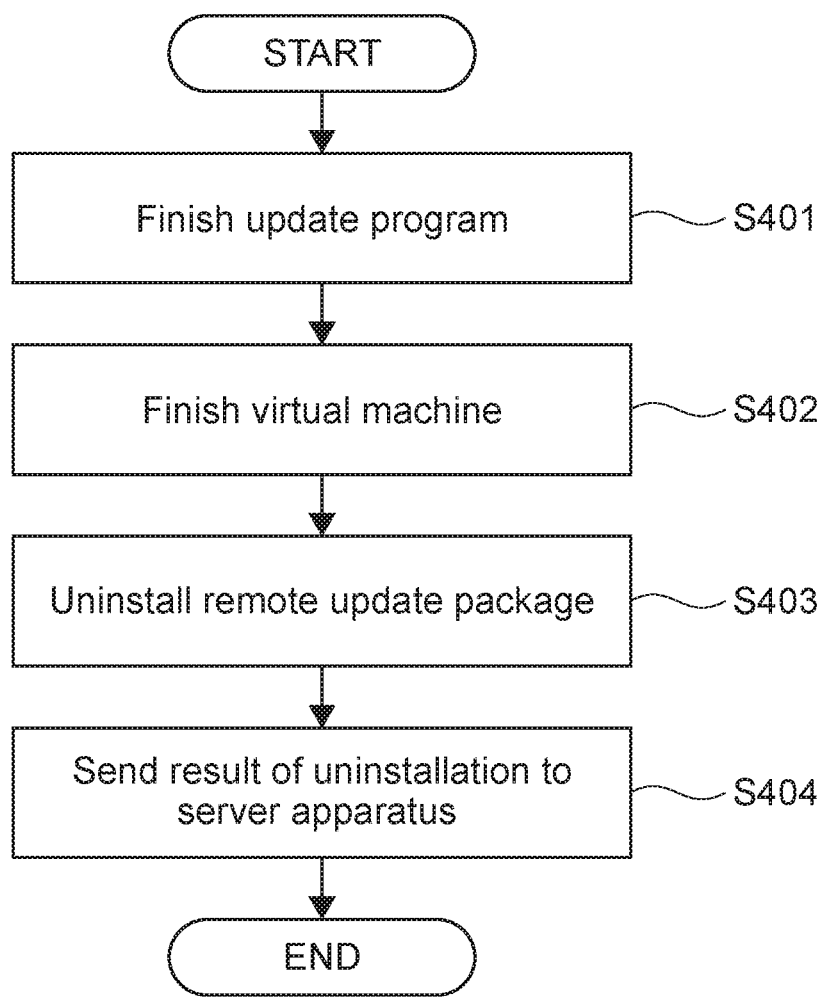
FIG. 15 shows an operational flow of uninstalling the remote update package by the client apparatus.

FIG. 15 shows an operational flow of uninstalling the remote update package by the client apparatus.

The remote update package 106 generated by the CPU 11 of the server apparatus 10 is configured to, after the client apparatus 20 updates the firmware 101 in the USB device 30, uninstall the remote update package 106 from the client apparatus 20.

The CPU 21 of the client apparatus 20 finishes the update program 102 being executed (Step S301) (Step S401). The CPU 21 of the client apparatus 20 finishes the virtual machine 105 being executed (Step S216) (Step S402). The CPU 21 of the client apparatus 20 uninstalls the remote update package 106 from the storage (Step S403). The CPU 21 of the client apparatus 20 sends the result of uninstallation of the remote update package 106 to the server apparatus 10 via the network interface 25 (Step S404).

The CPU 11 of the server apparatus 10 receives the uninstallation result from the client apparatus 20 via the network interface 15. The CPU 11 of the server apparatus 10 displays that uninstallation of the remote update package 106 is completed on the display device 17. Then the CPU 11 of the server apparatus 10 finishes a series of displaying.

7. MODIFICATION EXAMPLES (1) Modification Example 1

In some cases, a vendor of the USB device 30 supplies an open source code of an update program. In this case, it is not necessary to generate the virtual machine 105. Instead, the CPU 11 of the server apparatus 10 generates an update program executable by the CPU 21 of the client apparatus 20 by using the open source code. The CPU 11 of the server apparatus 10 generates a package including the generated update program and the firmware 101 supplied by the vendor of the USB device 30. The CPU 11 of the server apparatus 10 sends the generated package to the client apparatus 20, and causes the client apparatus 20 to execute the update program to update the firmware 101 in the external device 30.

(2) Modification Example 2

Let's say that the virtual machine 105 is installed in the client apparatus 20 not temporarily but permanently. Specifically, according to a conceivable example, the client apparatus 20 permanently executes a certain application program (antivirus program, etc.) by the virtual machine 105. In this case, it is not necessary for the server apparatus 10 to newly generate the virtual machine 105. The server apparatus 10 supplies the firmware 101 and the update program 102 to the client apparatus 20. The client apparatus 20 executes the update program 102 by the virtual machine 105, which is installed already.

Specifically, when executing the remote update program 104, the CPU 11 of the server apparatus 10 further determines whether or not the virtual machine 105 is installed in the client apparatus 20 via the network interface 15. If determining that the virtual machine 105 is installed, the CPU 11 of the server apparatus 10 sends the firmware 101 and the update program 102 and a control command for installing the firmware 101 and the update program 102 in the client apparatus 20 to the client apparatus 20 via the network interface 15 to cause the client apparatus 20 to execute the update program 102 by the virtual machine 105 to update the firmware 101 in the external device 30.

Therefore, the server apparatus 10 can remotely update the firmware 101 without newly generating the virtual machine 105 and supplying the virtual machine 105 to the client apparatus 20.

8. CONCLUSION

The USB device 30 such as a card reader may be used very frequently every day. For example, if the client apparatus 20 (MFP) is at an office, a user (worker) may log in to the client apparatus 20 (MFP) via the USB device 30 (card reader) with his/her ID card and then use the client apparatus 20 (MFP).

By the way, in order to update the firmware installed in the USB device 30 connected to the client apparatus 20, typically, the following procedure is executed in the following order. The USB device 30 (non-dedicated USB device) is removed from the client apparatus 20 (MFP), and is connected to a personal computer (not shown). The personal computer updates the firmware in the USB device 30. Next, the USB device 30, in which the firmware is updated, is removed from the personal computer, and is connected to the client apparatus 20.

This method is used because of the following reason. In many cases, a vendor of the non-dedicated USB device 30 supplies an update program that only supports a certain environment (typical operating system (OS) of a personal computer. For example, Windows (registered trademark) OS and/or mac OS (registered trademark) of certain version). However, an embedded device such as an MFP does not support such OS.

However, according to this method, the USB device 30 is removed and connected again and again, which is burdensome for a user. In addition, when the USB device 30 is removed from the client apparatus 20, it is impossible to use the USB device 30 connected to the client apparatus 20.

To the contrary, according to the present embodiment, the CPU 11 of the server apparatus 10 executes the remote update program 104 to thereby generate the remote update package 106 including the virtual machine 105, the firmware 101, and the update program 102 (Step S1). The CPU 11 of the server apparatus 10 remotely installs the remote update package 106 in the client apparatus 20 (Step S2). The CPU 21 of the client apparatus 20 executes the remote update package 106, and thereby updates the firmware 101 in the USB device 30 (Step S3).

Therefore, according to the present embodiment, the server apparatus 10 remotely updates the firmware installed in the USB device 30 connected to the client apparatus 20 via the network N. As a result, it is possible to update the firmware installed in the USB device 30 connected to the client apparatus 20 without removing the USB device 30 from the client apparatus 20.

Further, according to the present embodiment, it is not at all necessary to operate the client apparatus 20 to which the USB device 30 is connected. Therefore no work is required at all for a person (end user, etc.) at the client apparatus 20. It is only necessary to operate the server apparatus 10, which is used by a user who manages the client apparatus 20, to remotely update the firmware installed in the USB device 30 connected to the client apparatus 20. Further, one server apparatus 10 can remotely update the firmware installed in a plurality of USB devices 30 connected to a plurality of client apparatuses 20, respectively (for a specific example, a case where a plurality of USB devices 30 of the same model type are connected to a plurality of client apparatuses 20 of the same model type, respectively).

Further, according to the present embodiment, the remote update package 106 generated by the CPU 11 of the server apparatus 10 is configured to, after the client apparatus 20 updates the firmware 101 in the USB device 30, uninstall the remote update package 106 from the client apparatus 20. Therefore the remote update package 106, which is not used after updating the firmware 101, do not consume the storage of the client apparatus 20.

It should be understood by those skilled in the art that various modifications, combinations, sub-combinations and alterations may occur depending on design requirements and other factors insofar as they are within the scope of the appended claims or the equivalents thereof.

What is claimed is:

1. A server apparatus, comprising:
a network interface adapted to communicate with a client apparatus, wherein the client apparatus is an embedded device connected to a network;
a memory that stores:
a firmware of an external device connected to the client apparatus,
an update program of the firmware of the external device,
a plurality of different virtual machine sources for generating virtual machines that virtually realize a plurality of different environments, respectively, and
a remote update program for remotely updating the firmware of the external device; and
a first processor that executes the remote update program, wherein when the first processor executes the remote update program, the first processor:
selects the firmware of the external device and the update program of the firmware of the external device to be updated,
selects the client apparatus to which the external device is connected, in which the firmware of the external device is to be updated, via the network interface,
determines a configuration of a second processor via the network interface, wherein the second processor is a processor of the client apparatus,
determines an environment capable of executing the update program of the firmware of the external device,
selects a virtual machine source for generating a virtual machine that virtually realizes the determined environment out of the plurality of different virtual machine sources,
generates a virtual machine that virtually realizes the determined environment by the second processor, by using the selected virtual machine source,
generates a remote update package including the generated virtual machine, the firmware of the external device, and the update program of the firmware of the external device, and
sends the remote update package and a control command for installing the remote update package in the client apparatus to the client apparatus via the network interface to cause the client apparatus to execute the update program of the firmware of the external device by the virtual machine to update the firmware of the external device in the external device.

2. The server apparatus according to claim 1, wherein the external device is connected to the client apparatus via USB (Universal Serial Bus).

3. The server apparatus according to claim 1, wherein the remote update package generated by the first processor is configured to, after the client apparatus updates the firmware of the external device in the external device, uninstall the remote update package from the client apparatus.

4. The server apparatus according to claim 1, wherein when the first processor executes the remote update program, the first processor further:
determines whether or not the virtual machine is installed in the client apparatus via the network interface, and
if determining that the virtual machine is installed in the client apparatus, sends the firmware of the external device and the update program of the firmware of the external device and a control command for installing the firmware of the external device and the update program of the firmware of the external device in the client apparatus to the client apparatus via the network interface to cause the client apparatus to execute the update program of the firmware of the external device by the virtual machine to update the firmware of the external device in the external device.

5. A non-transitory computer readable recording medium that records a remote update program for remotely updating a firmware of an external device executable by a server apparatus,
the server apparatus including:
a network interface adapted to communicate with a client apparatus, wherein the client apparatus is an embedded device connected to a network;
a memory that stores:
a firmware of an external device connected to the client apparatus,
an update program of the firmware of the external device,
a plurality of different virtual machine sources for generating virtual machines that virtually realize a plurality of different environments, respectively, and
a remote update program for remotely updating the firmware of the external device; and
a first processor that executes the remote update program, wherein when the first processor executes the remote update program, the first processor:
selects the firmware of the external device and the update program of the firmware of the external device to be updated,
selects the client apparatus to which the external device is connected, in which the firmware of the external device is to be updated, via the network interface, determines a configuration of a second processor via the network interface, wherein the second processor is a processor of the client apparatus, determines an environment capable of executing the update program of the firmware of the external device, selects a virtual machine source for generating a virtual machine that virtually realizes the determined environment out of the plurality of different virtual machine sources, generates a virtual machine that virtually realizes the determined environment by the second processor, by using the selected virtual machine source, generates a remote update package including the generated virtual machine, the firmware of the external device, and the update program of the firmware of the external device, and sends the remote update package and a control command for installing the remote update package in the client apparatus to the client apparatus via the network interface to cause the client apparatus to execute the update program of the firmware of the external device by the virtual machine to update the firmware of the external device in the external device.

6. An update system, comprising:

a client apparatus, wherein the client apparatus is an embedded device connected to a network;

an external device connected to the client apparatus; and a server apparatus connected to the network, the server apparatus including:

a network interface adapted to communicate with the client apparatus, a memory that stores:
  a firmware of an external device connected to the client apparatus,
  an update program of the firmware of the external device,
  a plurality of different virtual machine sources for generating virtual machines that virtually realize a plurality of different environments, respectively, and
  a remote update program for remotely updating the firmware of the external device; and a first processor that executes the remote update program, wherein when the first processor executes the remote update program, the first processor:

selects the firmware of the external device and the update program of the firmware of the external device to be updated, selects the client apparatus to which the external device is connected, in which the firmware of the external device is to be updated, via the network interface, determines a configuration of a second processor via the network interface, wherein the second processor is a processor of the client apparatus, determines an environment capable of executing the update program of the firmware of the external device, selects a virtual machine source for generating a virtual machine that virtually realizes the determined environment out of the plurality of different virtual machine sources, generates a virtual machine that virtually realizes the determined environment by the second processor, by using the selected virtual machine source, generates a remote update package including the generated virtual machine, the firmware of the external device, and the update program of the firmware of the external device, and sends the remote update package and a control command for installing the remote update package in the client apparatus to the client apparatus via the network interface to cause the client apparatus to execute the update program of the firmware of the external device by the virtual machine to update the firmware of the external device in the external device.

* * * * *